United States Patent [19]

Mitchell et al.

[11] Patent Number: 4,488,174

[45] Date of Patent: Dec. 11, 1984

[54] METHOD FOR ELIMINATING MOTION INDUCED FLICKER IN A VIDEO IMAGE

[75] Inventors: Joan L. Mitchell, Ossining; William B. Pennebaker, Carmel, both of N.Y.

[73] Assignee: International Business Machines Corporation, Armonk, N.Y.

[21] Appl. No.: 383,406

[22] Filed: Jun. 1, 1982

[51] Int. Cl.[3] .......... H04N 7/13

[52] U.S. Cl. .......... 358/136; 340/728; 358/105

[58] Field of Search .......... 358/136, 105, 260; 340/728

[56] References Cited

U.S. PATENT DOCUMENTS 4,232,338 11/1980 Netravali .......... 358/105
4,245,248 1/1981 Netravali .......... 358/136
4,307,420 12/1981 Ninomiya .......... 358/136
4,355,306 10/1982 Mitchell .......... 358/260
4,369,463 1/1983 Anastassiou .......... 358/135
4,369,464 1/1983 Temime .......... 358/136
4,371,895 2/1983 Koga .......... 358/136

*Primary Examiner*—Howard W. Britton
*Attorney, Agent, or Firm*—George E. Clark

[57] ABSTRACT

In an image processing system, a method is shown for efficiently transmitting data representing picture information in fields subsequent to a first field and for suppressing motion induced flicker in the processed image. Using previously processed first field data which is used to predict values for picture elements in subsequent fields, a gradient value is calculated which indicates relative picture activity. A difference value for the picture elements in the subsequent fields is calculated and is limited in magnitude by the gradient value for each picture element. The limited difference value is encoded as a function of previous difference value and transmitted to a remote location for decoding and picture reconstruction and display.

15 Claims, 18 Drawing Figures

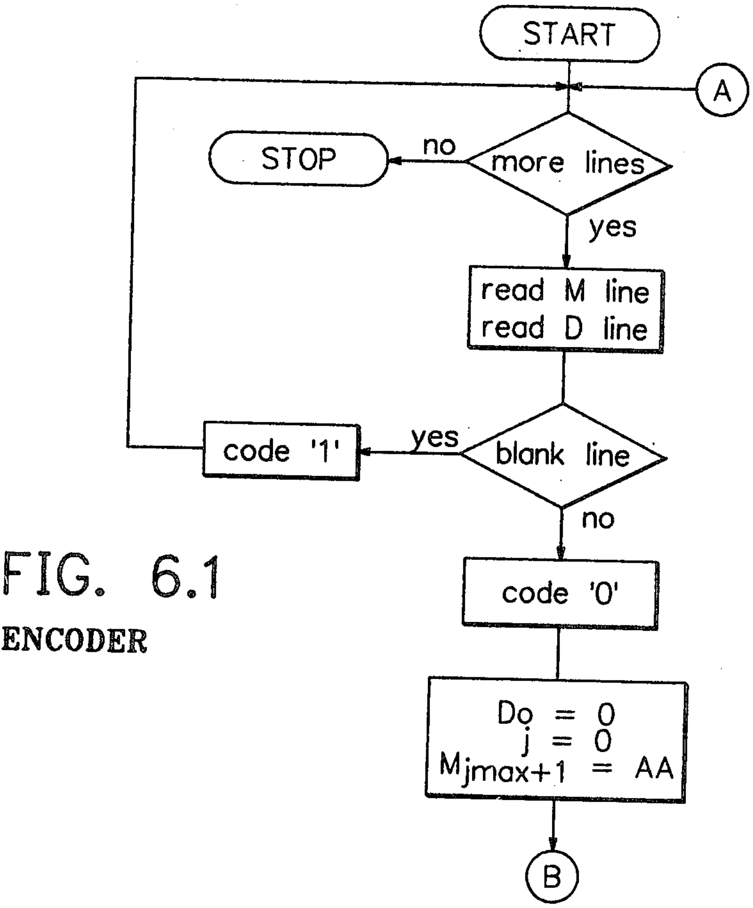
FIG. 6.1
ENCODER

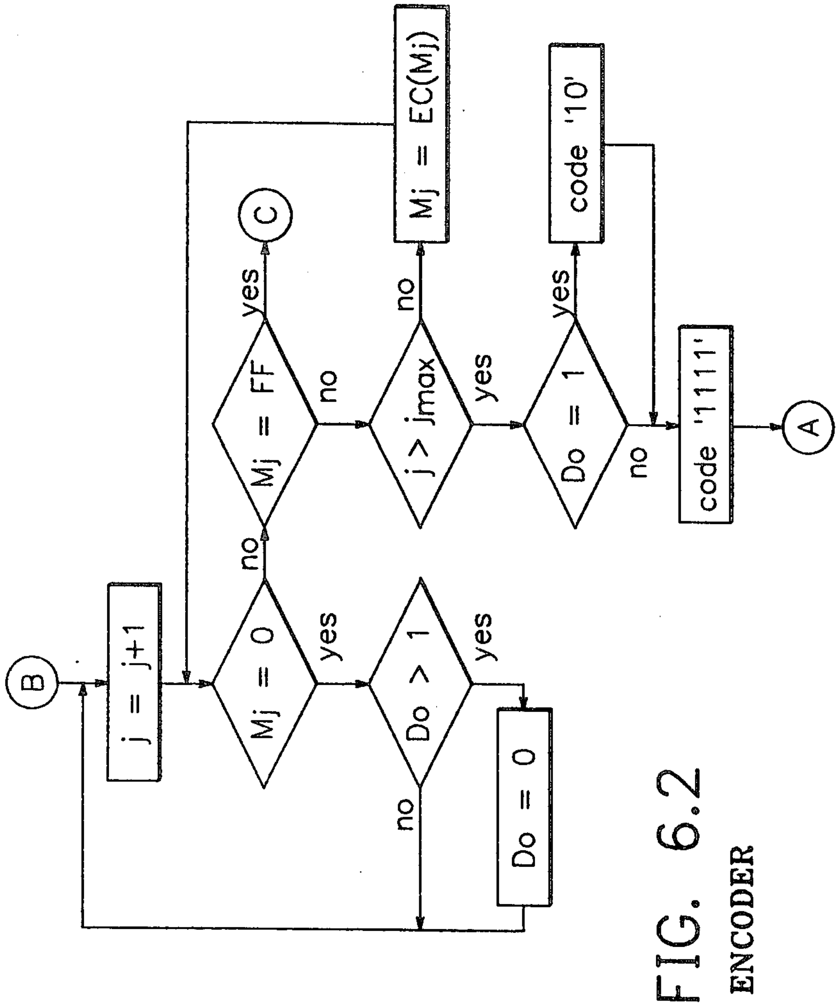
FIG. 6.2
ENCODER

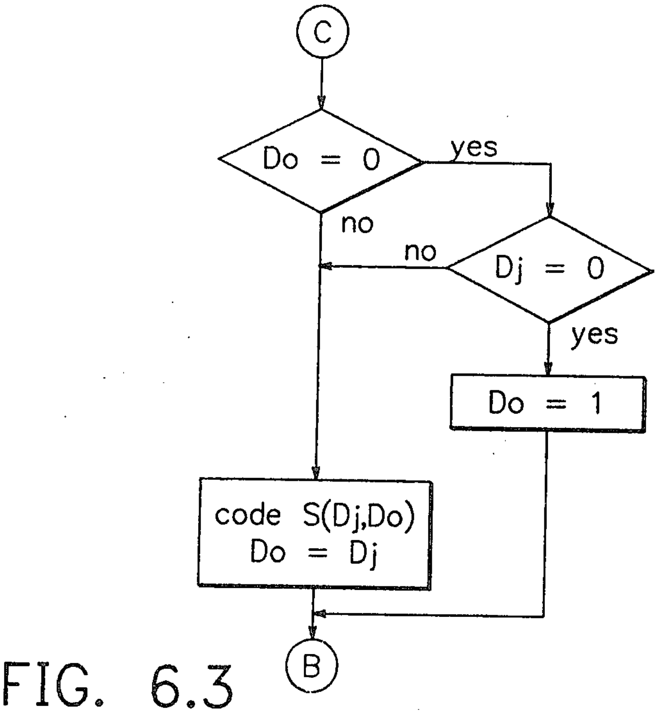
FIG. 6.3
ENCODER

FIG. 7

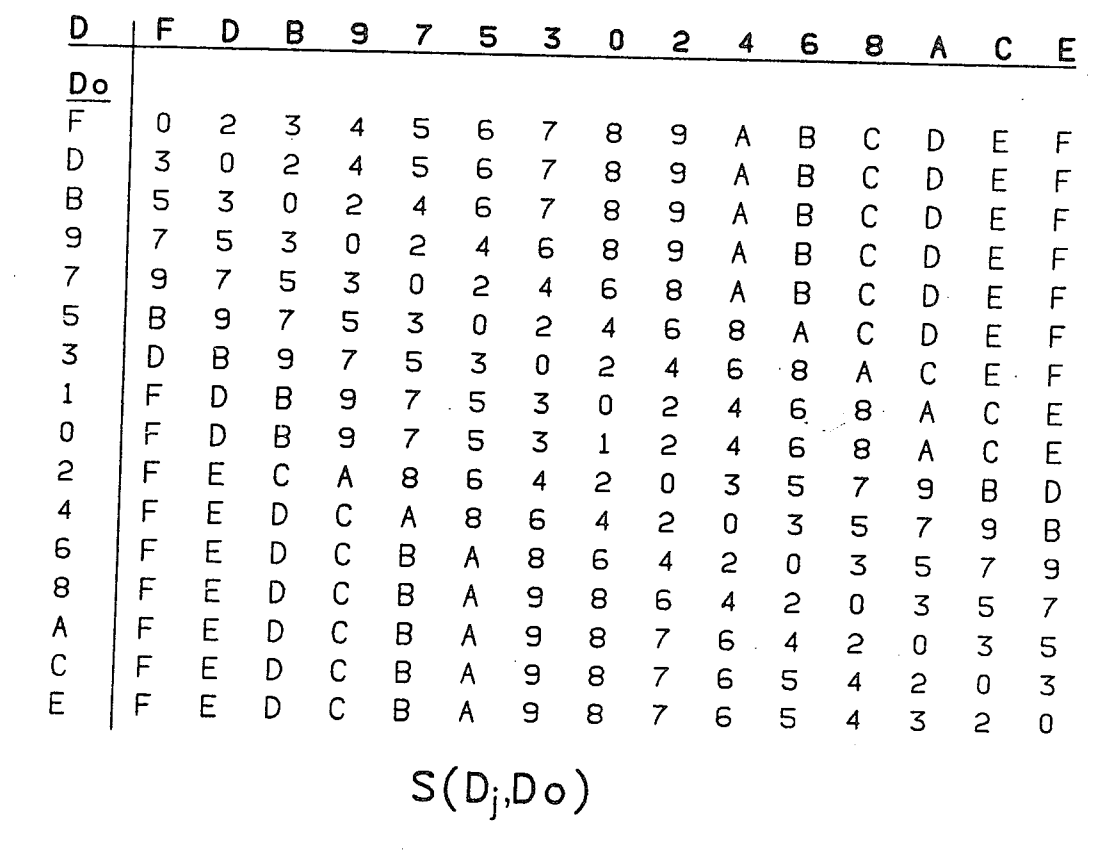

| Do \ D | F | D | B | 9 | 7 | 5 | 3 | 0 | 2 | 4 | 6 | 8 | A | C | E |
|---|---|---|---|---|---|---|---|---|---|---|---|---|---|---|---|
| F | 0 | 2 | 3 | 4 | 5 | 6 | 7 | 8 | 9 | A | B | C | D | E | F |
| D | 3 | 0 | 2 | 4 | 5 | 6 | 7 | 8 | 9 | A | B | C | D | E | F |
| B | 5 | 3 | 0 | 2 | 4 | 6 | 7 | 8 | 9 | A | B | C | D | E | F |
| 9 | 7 | 5 | 3 | 0 | 2 | 4 | 6 | 8 | 9 | A | B | C | D | E | F |
| 7 | 9 | 7 | 5 | 3 | 0 | 2 | 4 | 6 | 8 | A | B | C | D | E | F |
| 5 | B | 9 | 7 | 5 | 3 | 0 | 2 | 4 | 6 | 8 | A | C | D | E | F |
| 3 | D | B | 9 | 7 | 5 | 3 | 0 | 2 | 4 | 6 | 8 | A | C | E | F |
| 1 | F | D | B | 9 | 7 | 5 | 3 | 0 | 2 | 4 | 6 | 8 | A | C | E |
| 0 | F | D | B | 9 | 7 | 5 | 3 | 1 | 2 | 4 | 6 | 8 | A | C | E |
| 2 | F | E | C | A | 8 | 6 | 4 | 2 | 0 | 3 | 5 | 7 | 9 | B | D |
| 4 | F | E | D | C | A | 8 | 6 | 4 | 2 | 0 | 3 | 5 | 7 | 9 | B |
| 6 | F | E | D | C | B | A | 8 | 6 | 4 | 2 | 0 | 3 | 5 | 7 | 9 |
| 8 | F | E | D | C | B | A | 9 | 8 | 6 | 4 | 2 | 0 | 3 | 5 | 7 |
| A | F | E | D | C | B | A | 9 | 8 | 7 | 6 | 4 | 2 | 0 | 3 | 5 |
| C | F | E | D | C | B | A | 9 | 8 | 7 | 6 | 5 | 4 | 2 | 0 | 3 |
| E | F | E | D | C | B | A | 9 | 8 | 7 | 6 | 5 | 4 | 3 | 2 | 0 |

$S(D_j, Do)$

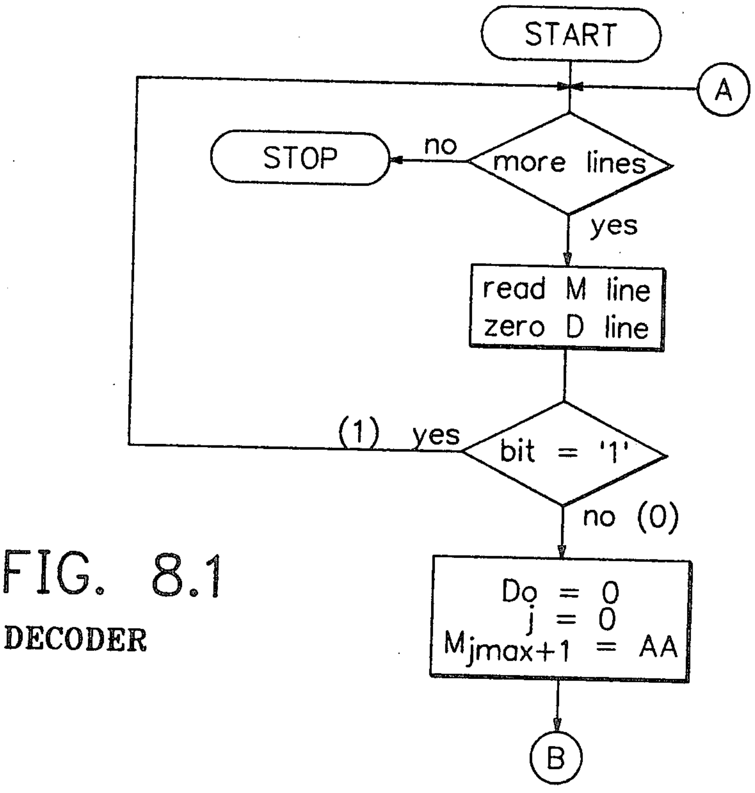
FIG. 8.1
DECODER

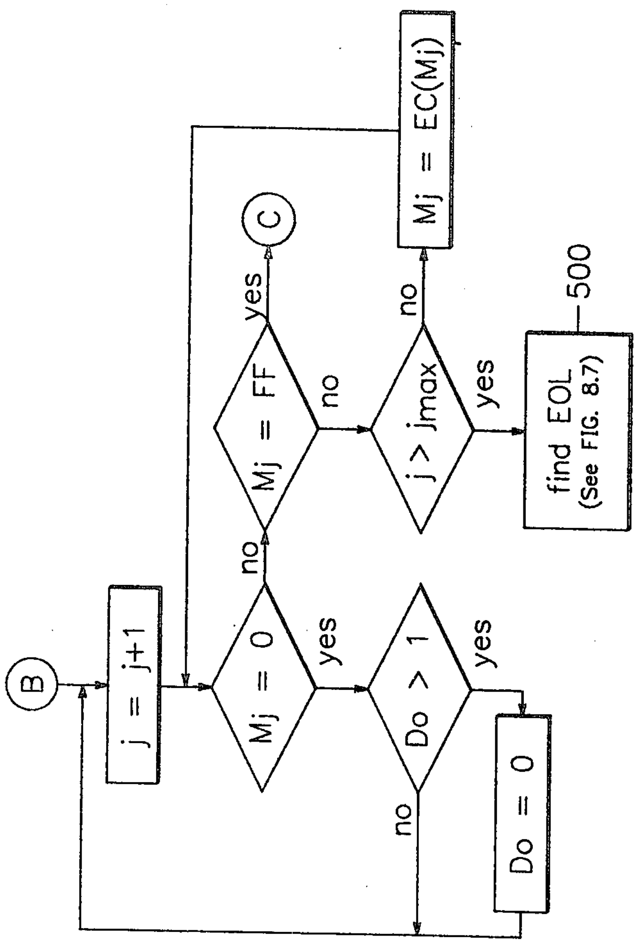
FIG. 8.2
DECODER

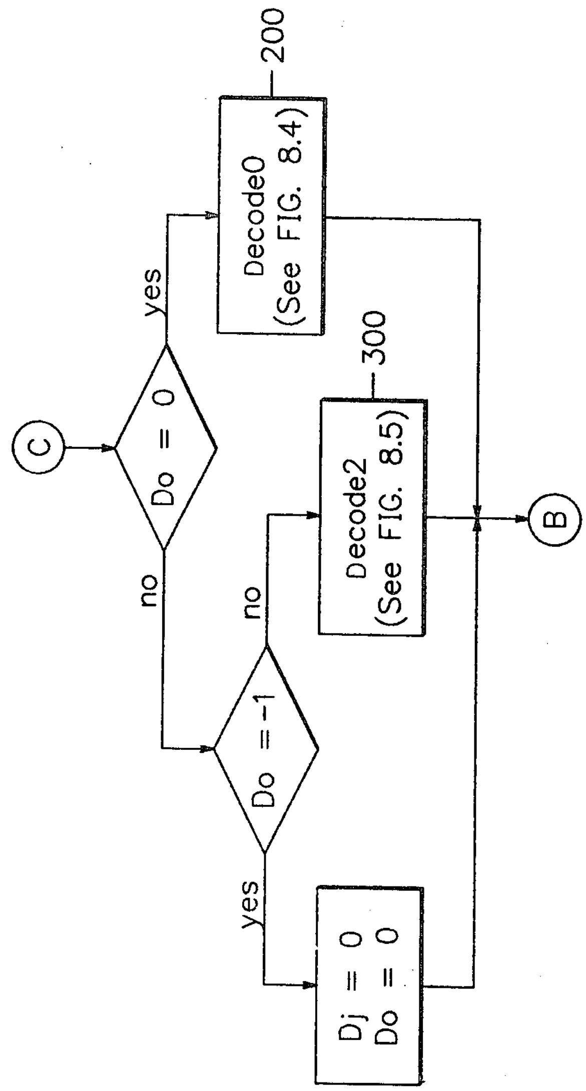
FIG. 8.3
DECODER

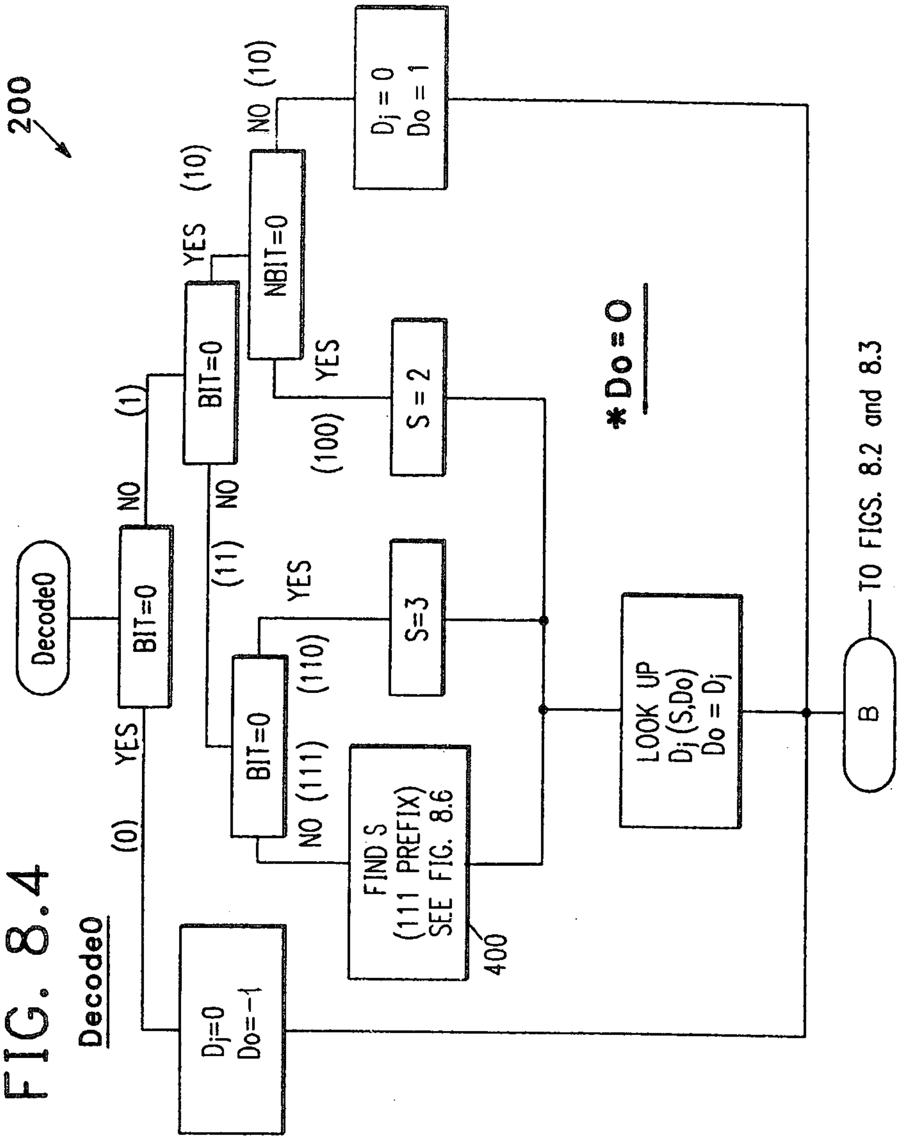
FIG. 8.4
Decode0

FIG. 8.5
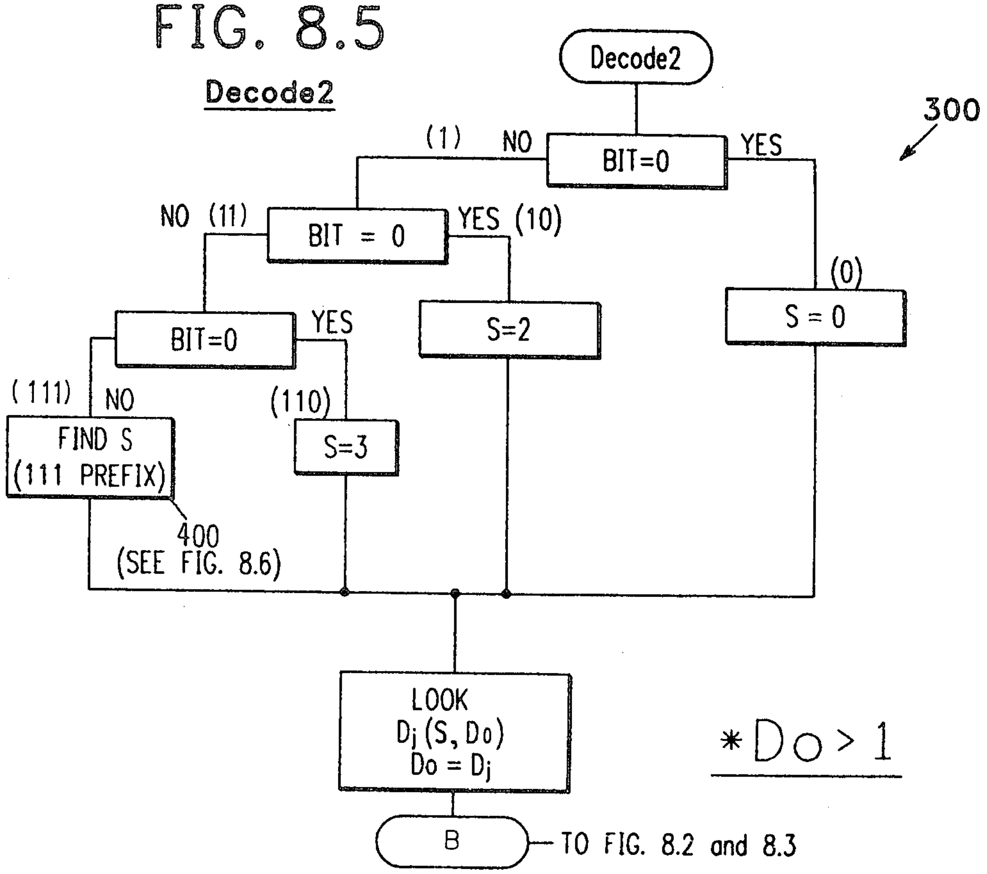

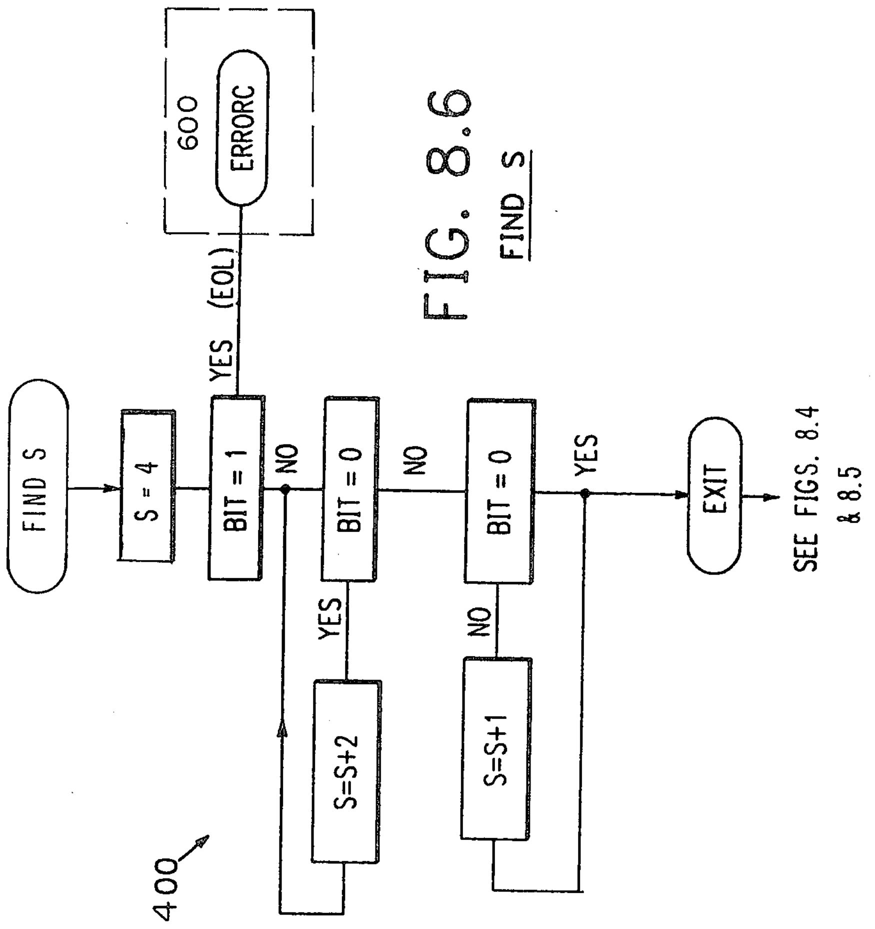
FIG. 8.6
FIND S

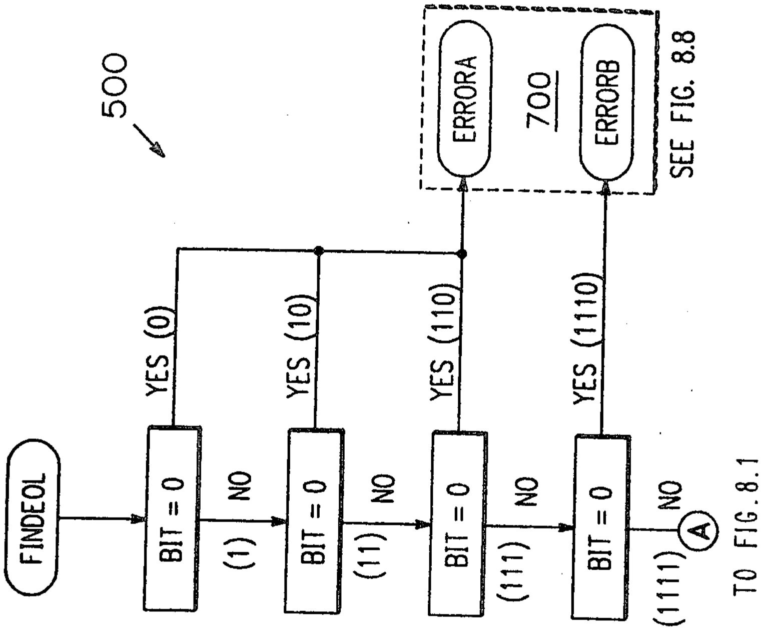
FIG. 8.7
FOUND EOL (1111)

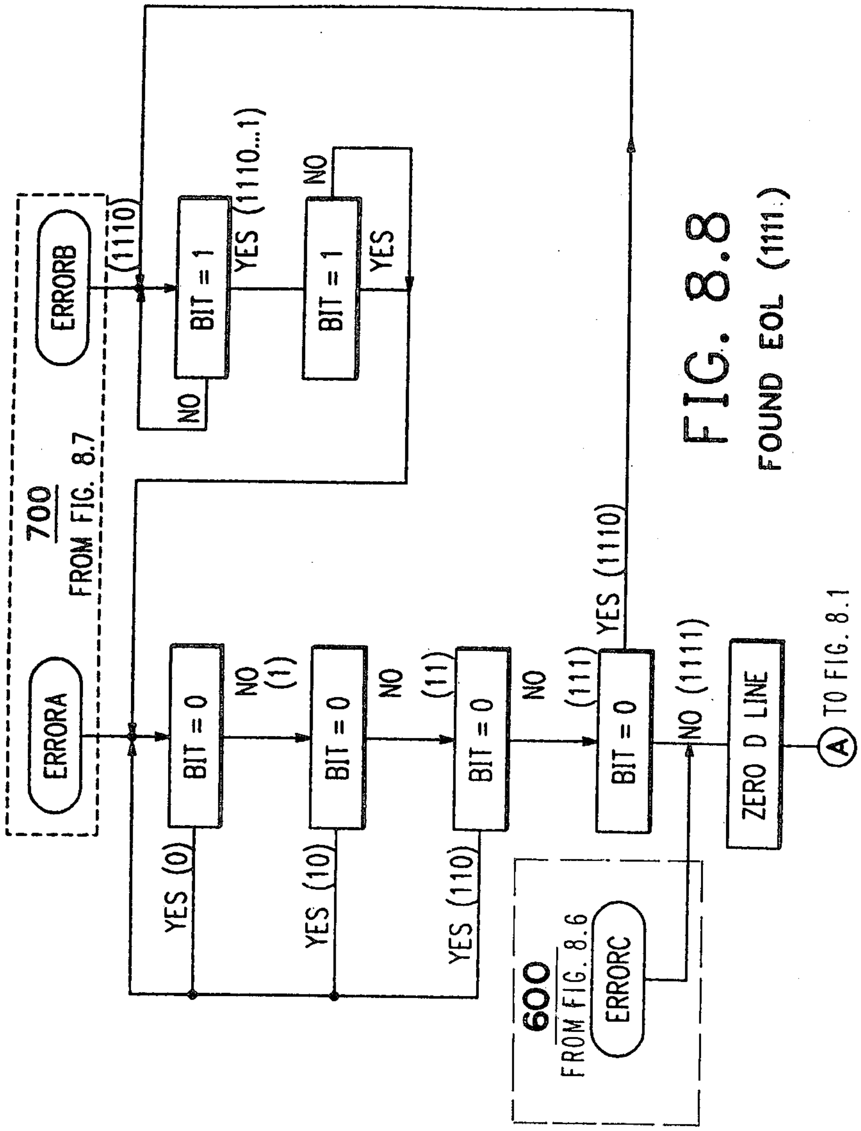
FIG. 8.8
FOUND EOL (1111)

FIG. 9

| Do / S | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 0 | 0 | 2 | 3 | 4 | 5 | 6 | 7 | 8 | 9 | A | B | C | D | E | F |
| 2 | 2 | 2 | 0 | 0 | 2 | 3 | 4 | 5 | 6 | 7 | 8 | 9 | A | B | C | D |
| 3 | 3 | 3 | 4 | 5 | 6 | 7 | 8 | 9 | A | B | C | D | E | F | A | B |
| 4 | 4 | 4 | 3 | 2 | 0 | 0 | 2 | 3 | 4 | 5 | 6 | 7 | 8 | 9 | 8 | 9 |
| 5 | 5 | 5 | 6 | 7 | 8 | 9 | A | B | C | D | E | F | 6 | 7 | 6 | 7 |
| 6 | 6 | 6 | 5 | 4 | 3 | 2 | 0 | 0 | 2 | 3 | 4 | 5 | 4 | 5 | 4 | 5 |
| 7 | 7 | 7 | 8 | 9 | A | B | C | D | E | F | 2 | 3 | 2 | 3 | 2 | 3 |
| 8 | 8 | 8 | 7 | 6 | 5 | 4 | 3 | 2 | 0 | 0 | 0 | 0 | 0 | 0 | 0 | 0 |
| 9 | 9 | 9 | A | B | C | D | E | F | 3 | 2 | 3 | 2 | 3 | 2 | 3 | 2 |
| A | A | A | 9 | 8 | 7 | 6 | 5 | 4 | 5 | 4 | 5 | 4 | 5 | 4 | 5 | 4 |
| B | B | B | C | D | E | F | 7 | 6 | 7 | 6 | 7 | 6 | 7 | 6 | 7 | 6 |
| C | C | C | B | A | 9 | 8 | 9 | 8 | 9 | 8 | 9 | 8 | 9 | 8 | 9 | 8 |
| D | D | D | E | F | B | A | B | A | B | A | B | A | B | A | B | A |
| E | E | E | D | C | D | C | D | C | D | C | D | C | D | C | D | C |
| F | F | F | F | E | F | E | F | E | F | E | F | E | F | E | F | E |

Dj(S,Do)

METHOD FOR ELIMINATING MOTION INDUCED FLICKER IN A VIDEO IMAGE

BACKGROUND OF THE INVENTION

The present invention relates to image data processing systems and more particularly to image data processing systems wherein the image data is processed and compressed to eliminate motion induced flicker in a displayed image and to improve efficiency of storage and transmission of image data between remote stations.

PRIOR ART

There have been many systems developed for compressing digital data representing picture elements in a video image. Among these are the techniques set forth in the copending patent applications Ser. No. 230,224 entitled "Dynamic Stack Data Compression and Decompression System", by Joan L. Mitchell, now U.S. Pat. No. 4,355,306, and "Gray Scale Image Data Compression with Code Words a Function of Image History, " Ser. No. 270,662, by D. Anastassiou and J. L. Mitchell, now U.S. Pat. No. 4,369,463.

The prior art of which the inventors of the present invention are aware with respect to data compression techniques are set forth in the above-identified copending applications.

With respect to elimination of motion induced flicker in video images, the inventors are unaware of any prior art which relates to the technique disclosed and claimed herein.

However, an article "Entropy Measurement for Nonadaptive and Adaptive, Frame-to-Frame, Linear Predictive Coding of Video-Telephone Signals", by B. G. Haskall published in the Bell System Technical Journal, Vol. 54, No. 6, pages 1155 through 1174 (1/9/75) mentions a second field pel predictor as an average of the first field pels above and below the pel to be predicted.

The article mentions only a prediction of a second field pel but does not relate a complete system for eliminating motion induced flicker through calculation of characteristics of a first and a second field in a multifield per frame video image.

A good discussion and description of a data encoding method that achieves excellent data compression is set forth in the copending patent application of Anastassiou and Mitchell referred to above.

The gray scale image data compression method set forth therein provides an excellent means for encoding and reconstructing a first field in a multifield per frame image display.

SUMMARY OF THE INVENTION

It is an object of the present invention to eliminate motion induced flicker in a multifield per frame image display.

It is another object of the present invention to compress data required for transmission of a second and subsequent fields of a multifield per frame image display.

Yet another object of the present invention is to predict a gray scale value for each pel in a second and subsequent fields of a multifield per frame image display.

Still another object of the present invention is to eliminate motion induced flicker in a multifield per frame image display by calculating gradient characteristics between a first field and subsequent fields in a multifield per frame display.

It is an advantage of the present invention that motion induced flicker is suppressed and data transmission requirements are reduced through the image processing method according to the present invention.

Other objects, features and advantages of the present invention will become apparent with reference to the following detailed description and drawing of a preferred embodiment of the invention.

BRIEF DESCRIPTION OF THE DRAWING

FIG. 6, which includes FIGS. 6.1, 6.2 and 6.3 is a flow chart showing a data transmission encoding process for efficient data transmission of image information according to the present invention.

FIG. 7 is a look up table chart for determining encoding state in accordance with the method of the present invention.

FIG. 8 which includes FIGS. 8.1, 8.2, 8.3, 8.4, 8.5, 8.6, 8.7 and 8.8 is a flow chart setting forth a transmitted data decoding process in accordance with the present invention.

FIG. 9 is a transmitted data decode look up table chart for use with the decoding process set forth in FIG. 8 according to the present invention.

DETAILED DESCRIPTION OF THE PREFERRED EMBODIMENT OF THE INVENTION

In both freeze frame and real-time video transmission, data compression can be used to reduce the communication and storage costs. A method is described herein for compression of the second and subsequent fields of a video image. The described method results in significant data compression improvement for text images as well as for graphics images. Compared with prior known methods for compressing intraframe video images, the method described herein improves compression by approximately a factor of five. An important objective of the method described is the suppression of motion induced flicker in freeze frame images.

If the video equipment employs the NTSC (National Television Systems Committee) standard (other standards are similar in their general properties), the video image is captured as two distinct interlaced fields, 1/60th of a second apart.

In the prior art image display systems only one field is often used, both to limit the quantity of data and to avoid flicker introduced when the object moves during image capture. If the object moves, the two sequentially captured images are not properly superimposed in the displayed image. The interlace no longer provides an effective refresh rate of 1/60th of a second; the parts of the image which do not overlap are refreshed at a rate of 1/30th of a second, which is below the critical flicker fusion frequency.

A method is described herein which suppresses motion induced flicker and improves data compression and which is ideally suited to the high speed non-recursive processing provided in currently available image processing units.

Figure 1:
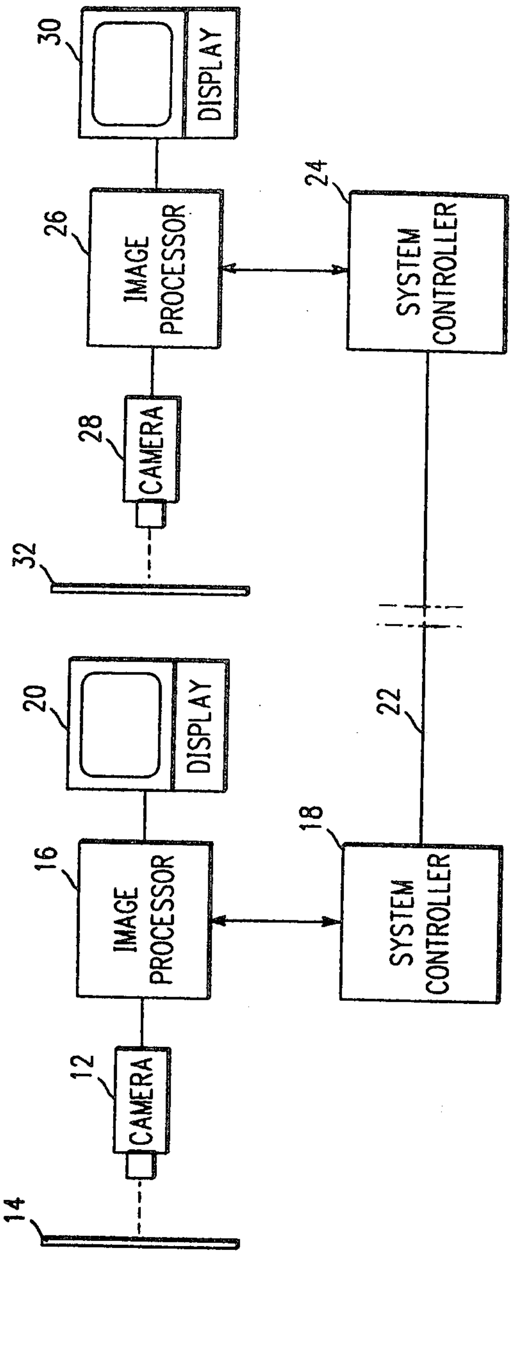
FIG. 1 is a block diagram of image display system apparatus for performing the method of the present invention.

FIG. 1 shows apparatus for capturing, processing and transmitting a video image which can support the method of the present invention.

Camera 12 is focussed on an object to be displayed which may be placed on or in front of a display board 14. The image information is transmitted from camera 12 to image processor 16 where it is digitized and processed in accordance with prior art data compression methods with respect to a first field of each frame and by the method of the present invention with respect to second and subsequent fields of each frame. Image processor 16 operates under the control of system controller 18 which controls all data processing and transmission functions of the system shown in FIG. 1. The processed image from image processor 16 is transmitted to local display 20 and to system controller 18 where it is retransmitted over a communication circuit 22 to a remote location system controller 24. At the remote location, system controller 24, image processor 26, camera 28, and display 30 are identical apparatus to the respective counterparts camera 12, image processor 16, system controller 18 and display 20.

The transmitted image data on transmission circuit 22 is sent to system controller 24 where it is decoded. The decoded data is then reconstructed by image processor 26 into a video image to be displayed on display 30 all in accordance with the method of the present invention.

The apparatus discussed with reference to FIG. 1 is commercially available and compatible without modification. For example, camera 12 may be any standard vidicon camera with appropriate lens system, such as, Cohu Model 4400; Image processor 16 and display 20 may be implemented by a Grinnell Model GMR-270 image processing display system and System Controller 18 may be implemented by an IBM Series I Computer System with standard keyboard for data and program entry, standard operator display and disk storage device for storage of program and data.

The encoding method of the present invention will be generally described with reference to FIG. 2.

The method is a form of differential pulse code modulation coding and includes the following steps:

First—the first field of the video image is encoded and reconstructed in accordance with known methods such as that shown in copending application Ser. No. 270,662 by Anastassiou and Mitchell. Both the encoder (local station) and the decoder (remote station) store a copy of the reconstructed first field in an image memory in image processors 16 and 26 for use in predicting pel values and reconstructing the second field. This reconstructed first field can be repeated twice in a display refresh buffer to produce an acceptable intermediate image. (Alternately, the predicted pel values from Step 2 for the second field can be used for an even better quality intermediate image.)

Figure 4:
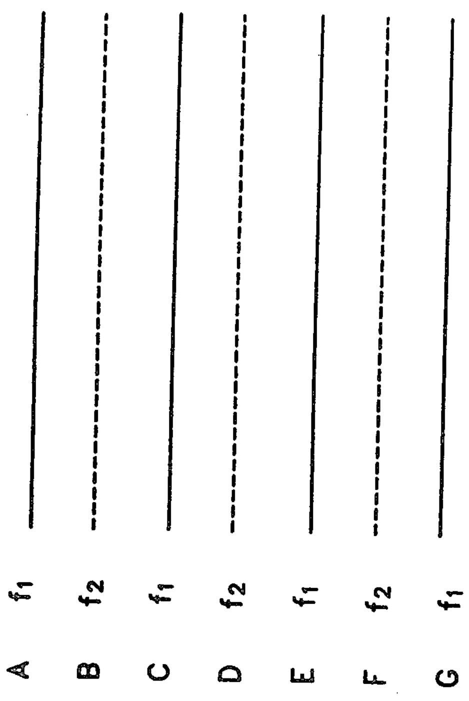
FIG. 4 is a schematic diagram showing the relationship of a number of lines in a first and second field of a multifield per frame image display according to the present invention.
Figure 5:
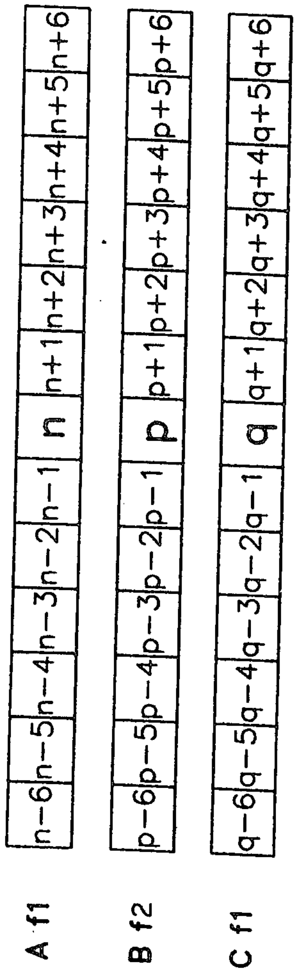
FIG. 5 is a schematic diagram showing the relationships between various pel locations in a multifield per frame image display according to the present invention.

Second—the value for each pel in the second and subsequent field of the video image is predicted from the reconstructed first field information. One implementation of the predictor for gray scale value of second field pels is to average the value of the pels on first field lines immediately above and below the current pel position in the second field. For example, see FIGS. 4 and 5. FIG. 4 shows a representation of a number of interlaced lines wherein lines A, C, E, and G represent lines in a first field of an interleaved multifield per frame image display and lines B, D and F represent lines of a second field. Lines A, C, E and G are all identified with the first field identifier $f_1$ and lines B, D and F are identified with the second field identifier $f_2$. FIG. 5 shows a sampling of a number of pel positions of first field lines A and C and second field line B. Pel positions on line A are labelled from n−6 through n+6 inclusive. Pel positions on line B are labelled p−6 through p+6 inclusive and pel positions on line C are labelled q−6 through q+6 inclusive. If pel position p in second field line B is to be predicted according to the averaging method, the value of pel n immediately above pel p is added to the value of pel q the pel immediately below pel p and the result is divided by 2 to achieve an average predicted value for pel p. $p=(n+q)/2$.

An average value predictor such as that discussed in the Haskall publication referred to above is well known in the art. The predictions for the entire second field can be calculated and stored in a small fraction of a second in an image processing system such as described with respect to FIG. 1. The predicted second field pel values are stored in an image memory $f_6$ in image processor 16.

Third—the reconstructed first field data can also be used to predict regions of strong activity such as by calculating the difference between pels above and below a current second field pel. Referring to the sample as shown in FIG. 5, a gradient value, GRAD, relative to pel p would be equal to the absolute magnitude of n−q divided by 2.

$$Grad = \frac{|n - q|}{2}$$

This is one method for producing a measure of gradient in the image. It should be noted that gradients may be referred to commonly as a vertical gradient due to the standardized top to bottom scanning where lines in a first field are above and below lines in a second field. However, it should be understood that if a different scanning standard was used, the invention set forth herein would equally apply.

Fourth—the magnitude of the vertical gradient calculated in the third step above, is then quantized into one of four binary states by table lookup employing a table having a transfer characteristic such as is shown in Table I below.

TABLE I

QUANTIZATION LEVELS FOR VERTICAL GRADIENT MAGNITUDE

| GRADIENT MAGNITUDE (GRAD) (decimal) Minimum | Maximum | QUANTIZATION STATE (binary) |
|---|---|---|
| 0 | 12 | 00 |
| 13 | 24 | 01 |
| 25 | 40 | 10 |
| 41 | 255 | 11 |

Only positive values are considered since GRAD is calculated from absolute value and has no sign.

It should be noted, that the first three quantization states represent relatively small changes in gradient magnitude while the fourth quantization state represents all gradient levels larger than the first three.

Table I shows that the four quantization states are encoded by two binary bits. These two binary bits representing quantization state are combined with three additional bits which are used for error detection and correction in subsequent steps of the method according to the present invention.

Fifth—a difference image is then calculated for the second field of each frame wherein the value of each pel in the predicted image is subtracted from the value of each corresponding pel in the original image previously calculated (in the second step, above) and stored. This step produces a difference image which may be quantized fairly coarsely by means of a lookup table, for example Table II below.

TABLE II

QUANTIZATION LEVELS FOR DIFFERENCE IMAGE

| DIFFERENCE RANGE (decimal) | | QUANTIZATION STATE |
| --- | --- | --- |
| min | max | (binary) |
| −256 | −105 | 1111 |
| −104 | −89 | 1101 |
| −88 | −73 | 1011 |
| −72 | −57 | 1001 |
| −56 | −41 | 0111 |
| −40 | −25 | 0101 |
| −24 | −13 | 0011 |
| −12 | 0 | 0000 (remapped from 0001) |
| 0 | 12 | 0000 |
| 13 | 24 | 0010 |
| 25 | 40 | 0100 |
| 41 | 56 | 0110 |
| 57 | 72 | 1000 |
| 73 | 88 | 1010 |
| 89 | 104 | 1100 |
| 105 | 255 | 1110 |

If the difference image value is negative, the least significant bit in the quantization state is set to 1.

Sixth—the maximum quantized gradient, M in an area of the image for a pel and a predetermined number of nearest neighbors is computed and used in place of the quantized gradient value calculated in the fourth step above.

For example, referring to FIG. 5, the gradients for pel pairs n−6/q−6 through n+6/q+6 have been calculated in the third step and quantized in the fourth step above. The maximum quantized gradient over a predetermined number of pel positions are calculated in the current step. It has been found that it is sufficient to consider the current pel position as well as the pel immediately preceeding and immediately succeeding the current pel position and to determine the maximum quantized gradient, M, of the group of three pel positions. Thus, the quantized gradient, G, representing the quantization of gradient value for the pel position p is compared to the quantized gradient, G−, representing the quantization of gradient value for pel position p−1 to determine which has a larger quantized gradient magnitude. That larger quantized gradient magnitude is then compared with the quantized gradient magnitude, G+, of pel position n+1.

The larger quantized gradient magnitude, or MAXGRAD, M, of this second comparison is then stored in place of the actual quantized gradient, G, for the current pel position n. The calculation of MAXGRAD in a neighborhood surrounding the current pel position is not necessary for proper operation of the method but does produce enhanced quality images.

Seventh—If the maximum gradient, referred to as Maxgrad or M, is less than a predetermined value, which value has been determined experically on the basis of image quality, then the quantized difference image, D, calculated in the fifth step above is limited in magnitude to M, for that current pel position.

For example, where M is zero, the difference image is set to zero.

The limiting of the difference image forces the reconstructed image to remain within the bounds dictated by the first field whenever the gradient is small. This step effectively suppresses motion induced flicker or scintillation. It also guarantees that large portions of the difference image are zero and the positions of the nonzero regions are known to both the encoder and decoder from the first field information, thus improving the compression by a factor of about 5.

Eighth—The difference image as limited by the seventh step above, is then encoded for transmission to a remote station and for reconstruction for local display of the processed image.

Referring now to FIG. 6, the encoding of the difference image for transmission and reconstruction will be described.

FIG. 6 is a flow chart of an encoding method to be used with the present invention and includes sheets 6.1, 6.2, and 6.3. A start signal is generated by system controller 18 in response to completion of the limiting step (seventh) above. A test is made to determine if the end of the image has been reached. If the end of the image has been reached, then a stop signal is presented since the full image has been encoded. The encoding is accomplished on a line by line basis. Considering the general case where more lines remain to be encoded, the maximum quantized gradients, M, and the quantized difference, D, for the next line are then fetched from storage for encoding. If the line of quantized differences is all zeros, a blank line is recognized and a short end of line (EOL) code is generated and the process loops back to point A to determine if there are further lines to be encoded.

The general end of line (EOL) code is 1111. For each additional blank line immediately following an end of line code, an additional 1 is sent in the EOL code string. Thus, for a single blank line following an EOL code the EOL string would be 11111 followed by 0. For two blank lines consecutively following an EOL code, the EOL string would be 111111 followed by 0. The trailing 0 in the EOL code string signals the end of the EOL code.

Thus, if it is determined that all quantized differences, D, are not 0 in the current line, the 0 is coded signalling the end of the EOL code string and encoding of the current line continues.

$D_0$ which is a quantized difference of the previous pel position for leftmost pel position at the beginning of the current line is set to 0, the pel counter j is set to 0 and the maximum gradient $M_{jmax+1}$ is set to hexidecimal AA which refers to a pel position immediately following the right edge of the image.

The pel counter j is incremented to j+1 to encode the first pel of the current line on a first pass.

The MAXGRAD $M_j$ is tested for 0. If $M_j$ equals 0, $D_0$ is tested for a value greater than 1. If $D_0$ is less than or equal to 1, a loop is made to the increment counter j step and the next pel position is considered. If $D_0$ is greater than 1, $D_0$ is set equal to 0 and a loop is made to increment counter j.

If $M_j$ is not equal to 0, $M_j$ is tested for all 1's.

There are three permissible values for $M_j$. These values are 0, representing no quantized gradient for the current pel position in the image information area of the display, all 1's representing all legal nonzero $M_j$'s in the image information area and hexidecimal AA which is a special code assigned to indicate $M_{jmaxAX+1}$, the MAXGRAD for the phantom pel position immediately following the right edge of the image.

Thus, from the two tests applied immediately above to the value of $M_j$, if $M_j$ is not equal to 0 and not equal to all 1's, the pel counter j is tested to determine whether j is greater than $j_{max}$ (the highest pel count position in a line). If j is less than $j_{max}$ an error is indicated since $M_j$ for that condition must be either 0 or all 1's. $M_j$ is then error corrected as follows:

$M_j$ is implemented as an 8 bit byte.

If there are 4 or more "1"s in the byte, $M_j$ is set to hexidecimal FF.

If there are 3 or fewer "1"s in the byte, $M_j$ is set to 00.

Referring again to FIG. 6.2, after the error correction has been completed, a loop is made to determine whether M is 0 or all 1's.

Should M equal all 1's, a test is made of quantized difference $D_0$ for 0 value. If $D_0$ equals 0, a test is made of $D_j$ (the quantized difference of the current pel position). If $D_j$ equals 0, $D_0$ is set to 1 and the process is then returned to increment counter j, the current pel position counter.

If either $D_0$ is not equal to 0 or $D_j$ is not equal to 0, a state code is generated which is a function of $D_0$ and $D_j$. FIG. 7 is a state chart showing the coding states S for the matrix of the $D_0$ and $D_j$ expressed as hexidecimal characters. A serial code is generated for each of the states shown in FIG. 7 as a function of $D_0$ value.

Table III shown below sets forth an embodiment of a serial bit code string for each state in the state diagram shown in FIG. 7 and the end of line indicator for $D_0$ values of 0, 1 and greater than 1.

TABLE III

| | TRANSMISSION ENCODING | | |
|---|---|---|---|
| STATE | Do = 0 | Do = 1 | Do > 1 |
| 0 | — | 0 | 0 |
| 1 | Set Do = 1 | — | — |
| 2 | 100 | 1010 | 10 |
| 3 | 110 | 10110 | 110 |
| 4 | 111010 | 10111010 | 111010 |
| 5 | 111011 | 10111011 | 111011 |
| 6 | 1110010 | 101110010 | 1110010 |
| 7 | 1110011 | 101110011 | 1110011 |
| 8 | 11100010 | 1011100010 | 11100010 |
| 9 | 11100011 | 1011100011 | 11100011 |
| A | 111000010 | 10111000010 | 111000010 |
| B | 111000011 | 10111000011 | 111000011 |
| C | 1110000010 | 101110000010 | 1110000010 |
| D | 1110000011 | 101110000011 | 1110000011 |
| E | 11100000010 | 1011100000010 | 11100000010 |
| F | 11100000011 | 1011100000011 | 11100000011 |
| EOL | 1111 . . . 0 | 101111 . . . 0 | 1111 . . . 0 |

Encoding Table III above, shows that for states 3 through F inclusive, the final i bits are identical in each state regardless of the value of $D_0$. Further, for states 2–F inclusive, there is always a prefix of "10" for a $D_{0=1}$.

As indicated previously, the EOL code requires four consecutive 1 bits to indicate end of line. Additional 1 bits may be added to the EOL string if next sequential lines have all D's equal to zero. The EOL bit string is terminated by a single 0 bit. It should be further noted, that the EOL code is the only code that allows four 1 bits in sequence.

After the encoding has been completed for $D_j$ as a function of $D_0$, $D_0$ is set equal to $D_j$ and encoding of the next pel is initialed by incrementing pel counter j.

A loop is then taken to increment the pel counter j to j+1 and the next pel position is encoded as described above. When j exceeds $j_{max}$, a test is made of $D_0$. If $D_0$ is not equal to 1, an end of line EOL bit string 1111 is coded. If $D_0$ equals 1, a binary prefix 10 is encoded immediately preceding the EOL string 1111 as shown in Table III above.

After the EOL code has been generated, the process then repeats at point A to determine if more lines must be encoded. When the last line has been encoded, a stop condition occurs and the processing terminates.

The serial bit stream generated by the encoding methods set forth the above, may be transmitted as generated to a remote location for decoding and reconstruction of the image to be displayed or the bit stream can be stored in a serial storage device for local use and/or later transmission.

A ninth and last step of the method according to the present invention is the reconstruction of the image to be displayed from the predicted value for each pel added to the difference value for each pel as limited by the MAXGRAD, M, in the seventh step above.

Figure 3:
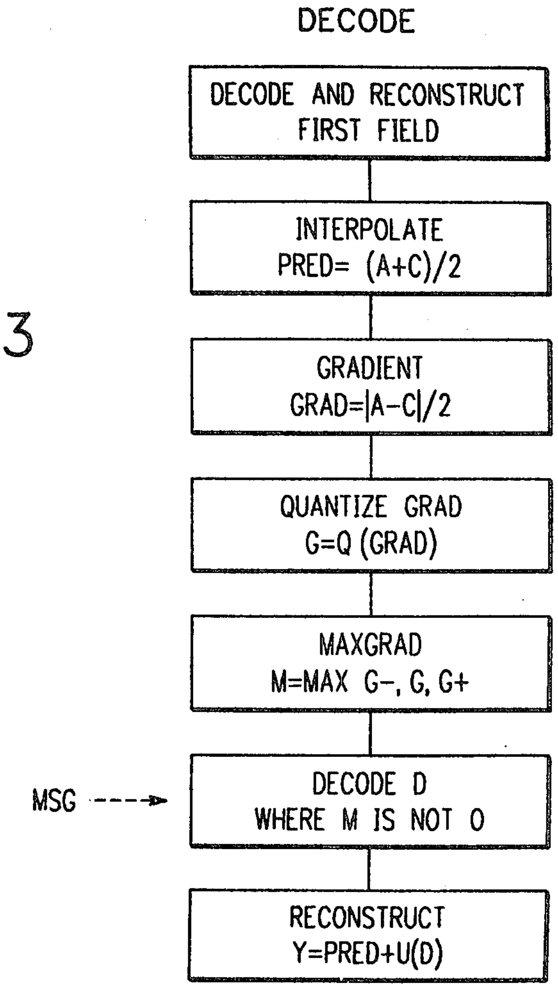
FIG. 3 is a flow diagram of a decoding method according to the method of the present invention.

Referring to FIG. 3, the decoding method according to the present invention is seen. The first field data is decoded and reconstructed as a precursor to the interpolation, decoding and reconstruction of the second field data. The method for decoding and reconstructing the first field data is known in the art and may be embodied by any number of data decoding and image reconstructing methods such as is discussed in the copending patent application Ser. No. 270,662 entitled "Gray Scale Image Data Compression With Code Words a Function of Image History" referred to above.

Figure 2:
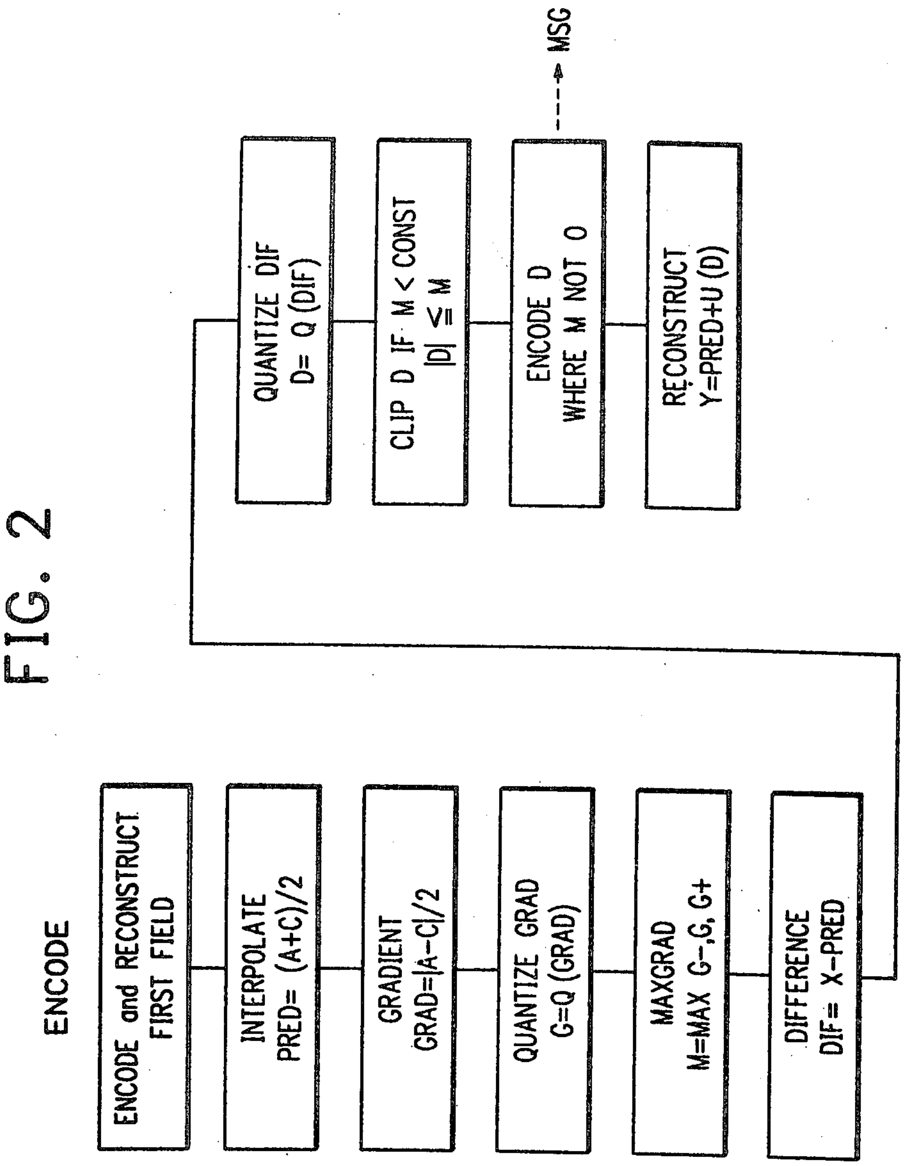
FIG. 2 is a flow diagram of an encoding method according to the present invention.

As was discussed above with respect to the encoding method as embodied in FIG. 2, the steps of predicting a pel value for a counter pel in a second field, calculating and quantizing a gradient value and determining a maximum neighorhood quantized gradient value are identical to the same steps employed in the encoding method according to the present invention.

As the serial data bit stream is received at the decoding (remote) station, the decoding process is performed. An example of the decoding process according to the present invention is shown in the flow chart of FIG. 8.

After the quantized and limited difference values have been completely decoded and stored, second and subsequent field pel values Y can then be reconstructed in the same manner as was discussed above with respect to step ninth in the encoding method. Pel value Y is calculated from the addition of the predicted value and the recovered, limited difference value which was transmitted from the sending station to the remote station.

The process for decoding the limited difference values transmitted to the receiving station will be described with reference to FIG. 8, a flow chart which shows a decoding method in accordance with the present invention. FIG. 8 is a sequential flow chart which includes FIGS. 8.1, 8.2, 8.3, 8.4, 8.5, 8.6, 8.7 and 8.8.

Referring now to FIG. 8 and more specifically, to FIG. 8.1, the decoding of an efficiently transmitted image will be further described.

Upon initiation of the decoding process, a test is made to determine if there are further lines to be decoded. If not, a stop signal is generated indicating that the entire image frame has been processed and decoded and is ready for display.

In the more general case, where there is one or more additional lines to be decoded, a line of M data is read and the D line is set to all zeros.

The next serial data bit is tested for a 1. If a 1 is present, the short EOL code is indicated and the process loops to point A to test for further lines to be processed. If the bit is 0, $D_o$ is set to 0, pel counter j is set to 0 and $M_{jmax+1}$ is set to hexidecimal AA. These initializing steps are the same as were performed in the encoding process described with reference to FIG. 6.

Next, pel counter j is incremented to j+1 and the decoding process continues as shown in FIG. 8.2 in the manner identical to the encoding process as described with reference to FIG. 6.2 with the only difference being that whereas if j is greater than $j_{max}$ indicating a pel position beyond the end of a line, in the encoding process, the end of line code is generated whereas in the decoding process, the bit stream must be tested to find end of line.

Find end of line block 500 refers to the subroutine shown in FIG. 8.7. Four bits in sequence are tested. If there is a four bit sequence of 1's, a loop is made to the start of the decoding routine at point A. If less than three 1 bits in sequence are detected, an error condition identified as ERROR A is indicated. If three 1 bits in succession are detected followed by a 0, a condition labelled ERROR B is indicated. Conditions ERROR A and ERROR B are dealt with in ERROR subroutine 600 shown in greater detail in FIG. 8.8.

If condition ERROR A has been detected, the next bits are tested until a 1 bit is detected. Subsequent bits in the bit stream are tested to determine if a sequence of four 1 bits have been detected indicating an end of line. If less than four 1 bits in sequence are detected, the subroutine loops and continues to test sequences of bits until four 1 bits have been found.

A special case occurs if three 1 bits in sequence are detected with the fourth bit 0. In this case, a loop is made to the ERROR B subroutine which in this event starts with a code stream of 1110. The next sequential bit is tested. If the bit is not a 1 bit, a loop occurs retesting subsequent bits until a 1 bit is detected. The next sequential bit is tested and bypassed regardless of whether the bit is a 1 or 0. In either event, the error subroutine then loops to the starting point of the ERROR A subroutine to attempt to find a sequence of four consecutive 1's indicating an end of line. When the end of line is finally detected, the current line of D data is all set to 0 and the process returns to loop point A, the start of the decoding process.

If in the testing for $M_j$ a hexidecimal code FF is detected, difference $D_j$ for pel position j must be decoded. The main process from FIG. 8.2 exits at point C to the decode routine shown in FIGS. 8.3, 8.4 and 8.5.

If the difference value of the previous pel position $D_0$ equals 0, exit is made to decode 0 subroutine 200 (FIG. 8.4). The next sequential bit is then tested. If the bit is 0, $D_j$ is set to 0, $D_0$ is set to −1 and process returns to point B to examine the next pel position.

If the bit tested is a 1, the next bit is tested to determine a code sequence. If the first two bits of the code sequence are 10, the next bit is tested. If the next bit is not 0, the $D_j$ is set to 0, $D_0$ is set to 1 and a return is made to point B. If the bit tested indicates a three bit sequence of 100, the state S is set to 2. The value $D_j$ as a function of S and $D_0$ is then obtained from the decode table shown in FIG. 9 and $D_0$ is set equal to $D_j$. The decode subroutine then loops back to point B.

If the first two bits of the sequence are found to be 11, and the third bit of the sequence is 0, S is set equal to 3, $D_j$ is determined from decode table shown in FIG. 9 and $D_0$ is set equal to $D_j$. The decode routine again returns to point B for the next pel position.

If the first three bits decoded for the current pel are 111, a branch is taken to subroutine 400 to determine the value of S. S is the state code as a function of $D_0$ and $D_j$. The FIND-S subroutine 400 is shown in greater detail in FIG. 8.6

Given that the first three bits in the decode sequence are 111, the next bit is tested. If the fourth bit in sequence is 1, an end of line code is indicated at a point other than end of line and a condition ERROR C is generated.

ERROR C (See FIG. 8.8, causes the current D line to be set to 0's and the program returned to point A to decode the next line of data if any.

If the fourth bit in the sequence is 0, S is set to 4 as an initial value and if the fifth bit in the sequence is 0, S is incremented to S+2 and a loop is made to test the next bit in the bit stream. The loop is continued until a 1 bit is found in the bit stream at which point the next sequential bit is tested. If the next sequential bit after the 1 bit is also a 1 bit, S is set to S+1 and access is made to the lookup table for determination of $D_j$ as described above. If the bit following the 1 bit is 0, indicating a 10 ending sequence, no change is made to the value of S and again access is made to the decode table shown in FIG. 9 to find the value of $D_j$.

The decode process continues by return to point B, incrementing of the pel counter J and the testing of MAXGRAD $M_j$. Referring again to FIG. 8.3 and also to FIG. 8.5, an alternative decoding path will be further described.

If it is determined that $D_0$ is not equal to 0 $D_0$ is tested for a value of 1. If $D_0$ equals −1, $D_j$ is set equal to 0, $D_0$ is set equal to 0 and a loop is made to point B.

If $D_0$ is not equal to 0 and not equal to −1, decode 2 subroutine 300 is taken. If the decode 2 subroutine 300 is taken, the third column in transmission and encoding table III indicates the bit stream sequence for the various states S for $D_0>1$. Referring to Table III and FIG. 8.5, the decode subroutine will be described. The first bit is tested. If the first bit is 0, S equals 0 and $D_j$ is obtained from the access of the decode table shown in FIG. 9 as a function of S and $D_0$. $D_0$ is also set equal to $D_j$ and a loop is made to point B. If the first bit is not 0, the next bit is tested. If the next bit is 0, a 10 sequence indicates a state S=2. Again the decode lookup table is accessed for the value of $D_j$ and $D_0$ is set to $D_j$.

If the second bit in the sequence is a 1, indicating a sequence of 11, the next bit is tested. If the next bit is 0, indicating a sequence of 110, state S=3 and a table look up is made to determine the value of $D_j$ as above.

If the third bit in the sequence is 1, the find S subroutine described above with reference to FIG. 8.6 is taken and the prefix 111 has been detected. In any event, processing continues decoding the values for $D_j$ until the end of line signal is detected at which point a return is made to point A to determine whether there are any further lines to be decoded in the image.

It should be noted that decode look up table FIG. 9 is nothing more than the inverse of the encode look up table of FIG. 7 where in FIG. 7 the state S is determined as a function of $D_j$ and $D_0$ whereas in the decode look up table FIG. 9 $D_j$ is determined as a function of S and $D_0$.

All information for the reconstruction of the efficiently transmitted image which has motion induced flicker suppressed is now available. As indicated above in the description of the encoding process, the reconstructed pel value Y for each pel position on each even line in the image is calculated by adding the interpolated value calculated from the odd field data added to the recaptured difference value for the pel. The recaptured difference value for each pel is obtained by a table look up access wherein for each hexadecimal (or 4 bit binary) quantized difference D there exists a difference value between −256 and +255.

The following Table IV sets forth representative recaptured difference values, referred to as U(D) in FIGS. 2 and 3, for various quantized difference states 0 through F respectively.

TABLE IV

RECAPTURED DIFFERENCE LOOKUP TABLE U(D)

| $D_j$ | DIFFERENCE |
|---|---|
| F | −112 |
| D | −96 |
| B | −80 |
| 9 | −64 |
| 7 | −48 |
| 5 | −32 |
| 3 | −18 |
| 0 | 0 |
| 2 | 18 |
| 4 | 32 |
| 6 | 48 |
| 8 | 64 |
| A | 80 |
| C | 96 |
| E | 112 |

EXAMPLE

The following is an example of the method according to the present invention setting forth values for each calculation in the process.

As indicated above, the method according to the present invention requires as a starting point an image which has been reconstructed from the first field encoded data stream. Odd lines (lines 1, 3, 5, etc.) are the direct reconstruction of the image lines; even lines (lines 2, 4, 6, etc.) are the average interpolated value of the odd lines above and below. The original image from which the first field (odd lines) was encoded is still available for calculations of the error between the interpolation and the original second field data in the encoder.

A typical image data string might be as follows:

| | | | | | | | | | | | | | | | | | | | | |
|---|---|---|---|---|---|---|---|---|---|---|---|---|---|---|---|---|---|---|---|---|
| 1st fld: | C0 | C2 | C3 | C4 | C3 | C2 | B1 | 97 | 76 | 42 | 1E | 31 | 73 | 8F | AA | BA | C0 | C2 | C5 | C4 |
| interp: | C0 | C2 | C3 | C3 | C3 | C1 | B9 | AB | 8F | 62 | 47 | 34 | 4A | 5F | 89 | 9D | B1 | BD | C0 | C2 |
| 1st fld: | C0 | C2 | C4 | C2 | C3 | C0 | C1 | C0 | A9 | 82 | 70 | 38 | 21 | 30 | 68 | 80 | A2 | B8 | BC | C0 |

The vertical gradient measure, $|(A-C)/2|$, is:

grad: 00 00 00 01 00 01 08 14 19 20 29 03 29 2F 21 1D OF 05 04 02

The threshold levels for quantization are typically:

| diff range: | 00–0C | 0D–18 | 19–28 | 29–38 | 39–48 | 49–58 | 59–68 | 69–FF |
|---|---|---|---|---|---|---|---|---|
| qdiff(+): | 00 | 02 | 04 | 06 | 08 | 0A | 0C | 0E |
| qdiff(−): | 00 | 03 | 05 | 07 | 09 | 0B | 0D | 0F |
| grad level: | 0 | 1 | 2 | 3 | 3 | 3 | 3 | 3 |
| qgrad: | 00 | 02 | 04 | 06 | 06 | 06 | 06 | 06 |

The least significant bit of qgrad and qdiff is the sign bit (always zero for qgrad).

Thresholding the gradients gives:

qgrad: 00 00 00 00 00 00 00 02 04 04 06 00 06 06 04 04 02 00 00 00

If the original second field image data is:

orig:
C3 C4 C6 C4 B6 B2 AC 92 73 39 05 45 83 80 98 A5 B3 C1 C4 C4

Then the difference image (orig-interp) is:

diff:
03 02 03 01_OD_OF_OD_19_1C_29_42 11 39 21 OF 08 02 04 04 02

Where a leading . indicates a negative quantity.

When quantized, this gives:

qdiff: 00 00 00 00 03 03 03 05 05 07 09 02 08 04 02 00 00 00 00 00

The least significant bit is the sign bit for the quantized diffs.

The maxgrad convolution gives:

mgrad: 00 00 00 00 00 00 02 04 04 06 06 06 06 06 06 04 04 02 00 00

The cdiff magnitude is clipped to mgrad to give D:

D: 00 00 00 00 00 00 03 05 05 07 09 02 08 04 02 00 00 00 00 00

Note that the first two non-zero cdiffs have been clipped, and that no clipping occurs for mgrad greater than 04.

Finally, the non-zero mgrads are remapped to M (00 or FF only), Since the data for M and D are interleaved in the same memory for convenient readout to the S/1, the result is:

| | | | | | | | | | | | | | | | | | | | | |
|---|---|---|---|---|---|---|---|---|---|---|---|---|---|---|---|---|---|---|---|---|
| M: | 00 | 00 | 00 | 00 | 00 | 00 | FF | FF | FF | FF | FF | FF | FF | FF | FF | FF | FF | FF | 00 | 00 |
| D: | 00 | 00 | 00 | 00 | 00 | 00 | 03 | 05 | 05 | 07 | 09 | 02 | 08 | 04 | 02 | 00 | 00 | 00 | 00 | 00 |
| label: | | | | | | | a | b | c | d | e | f | g | h | i | j | k | l | | |

The encoding state is a function of the present D and the old D, $D_0$. Assuming an EOL sequence precedes this data, the $D_O$ value is zero for the first pel where M is not zero. Thus:

| | |
|---|---|
| $D_0$: | 0 3 5 5 7 9 2 8 4 2 0 1 |
| D: | 3 5 5 7 9 2 8 4 2 0 0 0 |
| $S(D,D_0)$: | 3 3 0 3 3 9 7 4 2 2 1 0 |

The code string for this sequence would be:

| | | | | | | | | | | | | |
|---|---|---|---|---|---|---|---|---|---|---|---|---|
| $S(D,D_0)$: | 3 | 3 | 0 | 3 | 3 | 9 | 7 | 4 | 2 | 2 | 1 | 0 |
| $D_0$: | 0 | 3 | 5 | 5 | 7 | 9 | 2 | 8 | 4 | 2 | 0 | 1 |
| code: | 110 | 110 | 0 | 110 | 110 | 11100011 | 110011 | 111010 | 10 | 10 | | 0 |
| label: | a | b | c | d | e | f | g | h | i | j | k | l |

Note that pels k and 1 are sent as a pair.

The decoding process would develop the same information for M and for the interpolated value of second field pels. Except for lines where the EOL code forces a new line, the decoding process then decodes 1 pel for each non 0 gradient pel. If, due to error in calculating MAXGRAD, either too many or too few MAXGRADS, the EOL code will occur in the wrong place in the code stream. The decoder then finds the EOL, zeros out the D values for that line and goes on to the next line as described above with reference to FIG. 8.

The method described can achieve a data compression efficiency which results in a 256 level gray scale pel value being encoded by an average of less than 0.5 bits per pel over the entire image frame.

It should be further noted that a preferred embodiment of the method according to the present invention has been completely coded, is operational and has been fully tested.

Also, from the above description the method according to the present invention, generating line by line program code would be within the competence of persons skilled in the art.

Although the invention has been described with reference to a preferred embodiment thereof, it should be understood by those skilled in the art that various changes in scope and detail may be made without departing from the spirit of the invention.

Having thus described our invention, what we claim as new, and desire to secure by Letters Patent is:

1. In a multifield display system, wherein previous field data has been encoded and reconstructed, and wherein a value for each pel in a subsequent field has been predicted from information already encoded, a method of suppressing motion induced flicker and of compressing data in fields subsequent to said previous field in a displayed image, comprising the steps of:

(a) calculating a gradient value for each pel in said subsequent field from said encoded values of corresponding pels (b) calculating a difference value for each pel in said subsequent field from an original value for said each pel and said predicted value for each pel;

(c) limiting said difference value to said gradient value if said gradient value is less than a predetermined value for each pel;

(d) encoding said difference value if said gradient value for said pel is not equal to zero; and (e) reconstructing an image of said subsequent field from said predicted value for each pel and said encoded difference value for each pel.

2. A method according to claim 1 further comprising the steps of:

quantizing said difference value for each pel in said subsequent field;

encoding said quantized difference value if said gradient value for said pel is not equal to zero; and reconstructing an image of said subsequent field from said predicted value for each pel and said encoded quantized difference value for each pel.

3. A method according to claim 1 further comprising the step of transmitting a predetermined code indicative of a blank line if all difference values and limited difference values for pels in said subsequent field are zero.

4. A method according to claim 1 further comprising the step of transmitting a unique code containing difference values for an adjacent pair of pels having a predetermined relationship in said subsequent field to enhance data transmission efficiency.

5. A method according to claim 1 further comprising the step of storing said efficiently encoded image data for later access and use.

6. A method according to claim 1 further comprising the step of correcting errors in said steps of gradient value calculation, difference value calculation, difference limiting, and difference encoding by comparison of bit patterns in the data to be corrected.

7. A method according to claim 1 further comprising the step of correcting errors generated in the calculation of pel gradient values and counting 1 bits in a data byte representing gradient value and correcting said byte representing said gradient value to a predetermined value depending on the number of 1 bits counted for each said byte.

8. A method according to claim 1 further comprising the step of transmitting said encoded first field data and said encoded difference value for each pel in said subsequent field to a remote location for reconstruction of said image at said remote location.

9. A method according to claim 8 wherein said difference value for each pel is encoded as a function of a difference value for a previous pel in said subsequent field.

10. A method according to claim 9 further comprising the step of decoding said encoded difference value for each pel in said subsequent field as a function of a difference value for a previous pel in said subsequent field.

11. A method according to claim 1 further comprising the steps of:

quantizing said gradient value for each pel in said subsequent field; and limiting said difference value if said quantized gradient value is less than a predetermined value for each said pel.

12. A method according to claim 11 further comprising the step of calculating for each said pel and predetermined adjacent pels a maximum quantized gradient value.

13. A method according to claim 12 wherein said difference value is limited if said maximum quantized gradient value is less than a predetermined value for each said pel.

14. A method according to claim 13 further comprising the step of quantizing said difference value for each pel in said subsequent field.

15. A method according to claim 14 wherein said quantized difference value is encoded if said gradient value for said pel is not equal to zero.

* * * * *